United States Patent
Jang et al.

(10) Patent No.: US 9,900,094 B2
(45) Date of Patent: Feb. 20, 2018

(54) VISIBLE-LIGHT WIRELESS COMMUNICATION APPARATUS AND METHOD USING THE SAME

(71) Applicant: ELECTRONICS AND TELECOMMUNICATIONS RESEARCH INSTITUTE, Daejeon (KR)

(72) Inventors: Il-Soon Jang, Daejeon (KR); Tae-Gyu Kang, Daejeon (KR); Myung-Soon Kim, Daejeon (KR); Sang-Kyu Lim, Daejeon (KR); Jin-Doo Jeong, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/189,385

(22) Filed: Jun. 22, 2016

(65) Prior Publication Data

US 2017/0099103 A1     Apr. 6, 2017

(30) Foreign Application Priority Data

Oct. 5, 2015  (KR) .................. 10-2015-0139693

(51) Int. Cl.
| | |
|---|---|
| H04B 10/00 | (2013.01) |
| H04B 10/116 | (2013.01) |
| H04B 10/50 | (2013.01) |
| H04B 10/516 | (2013.01) |
| H04B 10/60 | (2013.01) |

(52) U.S. Cl.
CPC ......... *H04B 10/116* (2013.01); *H04B 10/502* (2013.01); *H04B 10/516* (2013.01); *H04B 10/60* (2013.01)

(58) Field of Classification Search
CPC .... H04B 10/116; H04B 10/502; H04B 10/54; H04B 10/1149; H04L 27/2697
USPC ........................................................ 398/118
See application file for complete search history.

(56) References Cited

U.S. PATENT DOCUMENTS

| | | | |
|---|---|---|---|
| 8,588,616 B2* | 11/2013 | Langer | H04B 10/1141 139/191 |
| 8,630,549 B2 | 1/2014 | Kim et al. | |
| 2010/0247112 A1* | 9/2010 | Chang | H04B 10/1149 398/182 |
| 2012/0087676 A1* | 4/2012 | Lim | H04B 10/116 398/182 |
| 2013/0266314 A1 | 10/2013 | Lee et al. | |
| 2014/0010540 A1 | 1/2014 | Jeong et al. | |
| 2017/0149500 A1* | 5/2017 | Aoyama | H04B 10/116 |

FOREIGN PATENT DOCUMENTS

KR   10-2011-0055789 A   5/2011

* cited by examiner

*Primary Examiner* — Don N Vo
(74) *Attorney, Agent, or Firm* — Rabin & Berdo, P.C.

(57) ABSTRACT

Disclosed herein is a method of performing visible-light wireless communication using light-emitting diode (LED) illumination, in which Variable Pulse Position Modulation (VPPM) is used for low-speed data transmission and dimming of illumination, and orthogonal frequency division multiplexing (OFDM) modulation is used in a VPPM on period for high-speed data transmission.

20 Claims, 5 Drawing Sheets

VISIBLE-LIGHT WIRELESS COMMUNICATION APPARATUS AND METHOD USING THE SAME

CROSS REFERENCE TO RELATED APPLICATION

This application claims the benefit of Korean Patent Application No. 10-2015-0139693, filed Oct. 5, 2015, which is hereby incorporated by reference in its entirety into this application.

BACKGROUND OF THE INVENTION

1. Technical Field

The present invention generally relates to a method for performing visible-light wireless communication using light-emitting diode (LED) illumination and, more particularly, to an apparatus and method for delivering data while controlling the brightness of the illumination.

2. Description of the Related Art

"Visible light" refers to electromagnetic waves having a wavelength in a range visible to human eyes, that is, about 380 nm to 780 nm. In the visible light, a change of properties with respect to wavelength is expressed as color, namely red to violet as the wavelength decreases. Light having a longer wavelength than red is referred to as infrared light, and light having a shorter wavelength than violet is referred to as ultraviolet light. Monochromatic light appears red for wavelengths of about 700 nm to about 610 nm, orange for wavelengths of about 610 nm to about 590 nm, yellow for wavelengths of about 590 nm to 570 nm, green for wavelengths of about 570 nm to about 500 nm, blue for wavelengths of about 500 nm to about 450 nm, and violet for wavelengths of about 450 nm to about 400 nm. The light appears in various colors, with a mixture of colors for respective wavelengths.

Visible-light wireless communication, which is a wireless communication technique using a wavelength in a visible light range of about 380 nm to about 780 nm, is similar to infrared communication, but uses a different wavelength range. Such communication techniques using light in a communication range include infrared data association (IrDA) using an IR range, visible-light wireless communication using visible light, optical communication using optical fibers, and so forth.

The term "IrDA" refers to a private standardization organization established in 1993 to establish standards for IR data communication, but most often refers to communication standards established by the IrDA. The main standards used in personal computers (PCs) include IrDA1.0, providing a data rate of about 2.4 to about 115.2 kbps, and IrDA1.1 providing a data rate of about 1.152 Mbps and a data rate of about 4 Mbps. Communication according to IrDA takes place in an IR range having a wavelength of about 850 nm to about 900 nm.

Visible-light wireless communication is a communication technique using a wavelength of about 380 nm to about 780 nm, and is currently being standardized, with a study group in the Institute of Electrical and Electronics Engineers (IEEE) 802.15 Wireless Personal Area Network (WPAN), and domestically, a visible-light wireless communication working party has been struck by the Telecommunications Technology Association (TTA).

Visible light is light that is visible to humans, unlike ultraviolet light and infrared light, and an illumination source that emits the visible light has various requirements, such as accurate color representation. One of the requirements is avoidance of flickering. However, humans cannot perceive flickering at a speed of 200 times per second, and thus illumination using a light-emitting diode (LED) flickers based on pulse width modulation using quick blinking performance of the LED to lengthen the lifespan of the light and to reduce the energy consumed for illumination.

U.S. Patent Application Publication No. 2014-0010540 discloses a technique for simultaneously performing brightness control of an illumination source and data transmission using Variable Pulse Position Modulation (VPPM) for the illumination and data transmission in visible-light communication.

However, conventional visible-light wireless communication using VPPM transmission fails to incorporate orthogonal frequency division multiplexing (OFDM), resulting in a low data rate.

SUMMARY OF THE INVENTION

Accordingly, the present invention has been made keeping in mind the above problems occurring in the prior art, and an object of the present invention is to simultaneously provide the advantages of both high-speed data delivery of OFDM and illumination dimming provided in VPPM transmission.

Another object of the present invention is to enable data communication by receiving a transmitted signal through an existing device including an image sensor, e.g., through a smartphone having a camera mounted thereon, without a need to include a separate dedicated visible-light wireless communication receiver.

Another object of the present invention is to enable high-speed data transmission and reception by including a dedicated visible-light wireless communication receiver.

In accordance with an aspect of the present invention to accomplish the above objects, there is provided a visible-light wireless communication apparatus including a brightness control unit configured to output a brightness control signal for adjusting the brightness of an illumination source, a first modulation unit configured to receive a first signal and the brightness control signal, to modulate the first signal, and to output a first modulation signal as the first signal, a second modulation unit configured to receive a second signal and the first modulation signal and to modulate the second signal if the first modulation signal is at a particular level, and to output a second modulation signal as the second signal, and an optical signal transmission unit configured to receive the second modulation signal and to output a visible-light wireless communication signal as the received second modulation signal.

The first modulation unit may be further configured to modulate the first signal using Variable Pulse Position Modulation (VPPM) for controlling the width of a pulse depending on the brightness control signal and to output the first modulation signal.

The second modulation unit may be further configured to modulate the second signal using orthogonal frequency division multiplexing (OFDM) and to output the second modulation signal as the modulated second signal, when the first modulation signal is at an on level.

The optical signal transmission unit may include a light-emitting unit comprising a light-emitting diode (LED).

The second modulation unit may include a linear digital-to-analog converter (DAC).

In accordance with another aspect of the present invention to accomplish the above object, there is provided a visible-light wireless communication apparatus including an optical signal reception unit configured to receive a visible-light wireless communication signal and to output a raw reception signal, a signal extraction unit configured to extract a first reception signal from the raw reception signal and to output the extracted first reception signal, a first demodulation unit configured to demodulate the first reception signal and to receive a first signal as the demodulated first reception signal, and a second demodulation unit configured to demodulate the raw reception signal and to receive the demodulated raw reception signal as a second signal, when the first reception signal is at a particular level.

The signal extraction unit may be further configured to extract a Variable Pulse Position Modulation (VPPM) signal from the raw reception signal and to output the first reception signal as the extracted VPPM signal.

The first demodulation unit may be further configured to demodulate the first reception signal using VPPM and to receive the first signal as the demodulated first reception signal.

The second demodulation unit may be further configured to demodulate the raw reception signal using OFDM and to receive the second signal as the demodulated raw reception signal, when the first reception signal is at an on level.

The optical signal reception unit may include a light-receiving unit comprising a photodiode.

The optical signal reception unit may include a noise cancellation unit for cancelling a noise signal from the received optical signal.

The second demodulation unit may include a linear analog-to-digital converter (ADC).

The signal extraction unit may include a low-pass filter (LPF).

In accordance with another aspect of the present invention to accomplish the above object, there is provided a visible-light wireless communication method including generating a brightness control signal, modulating a first signal into a first modulation signal based on the brightness control signal, modulating a second signal into a second modulation signal when the first modulation signal is at a particular level, and transmitting a visible-light wireless communication signal as the second modulation signal.

Modulating of the first signal may include modulating the first signal using Variable Pulse Position Modulation (VPPM) for controlling the width of a pulse depending on the brightness control signal.

Modulating of the second signal may include modulating the second signal using orthogonal frequency division multiplexing (OFDM) when the first modulation signal is at an on level.

The visible-light wireless communication method may further include receiving a raw reception signal as the visible-light wireless communication signal, extracting a first reception signal from the raw reception signal, demodulating the first reception signal and receiving the first signal as the demodulated first reception signal, and demodulating the raw reception signal and receiving the second signal as the demodulated raw reception signal, when the first reception signal is at a particular level.

Extracting of the first reception signal may include extracting the VPPM signal from the raw reception signal.

Receiving the first signal may include demodulating the first reception signal using VPPM and receiving the first signal as the demodulated first reception signal.

Receiving the second signal may include demodulating the raw reception signal using OFDM and receiving the second signal as the demodulated raw reception signal when the first reception signal is at an on level.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
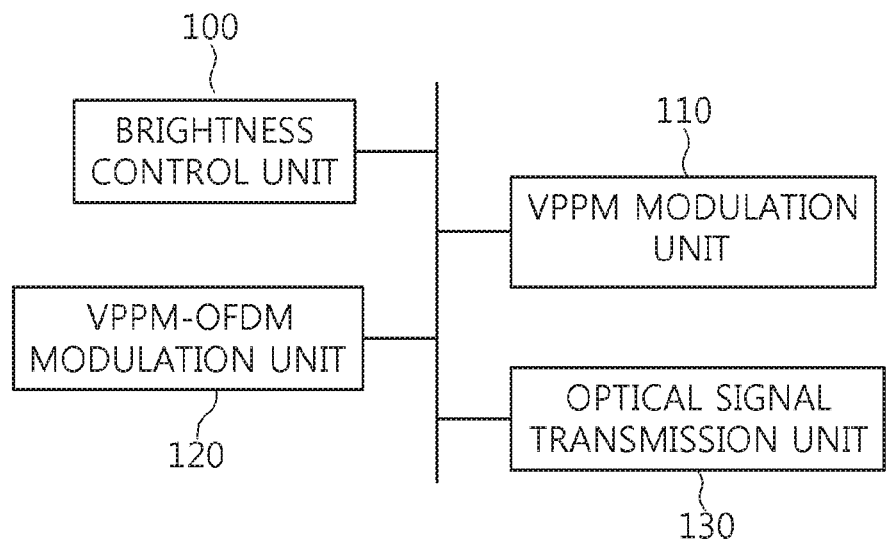
FIG. 1 is a block diagram of a visible-light wireless transmitter according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below.

The embodiments of the present invention are intended to fully describe the present invention to a person having ordinary knowledge in the art to which the present invention pertains. Accordingly, the shapes, sizes, etc. of components in the drawings may be exaggerated to make the description clearer.

The present invention may be variously changed and may have various embodiments, and specific embodiments will be described in detail below with reference to the attached drawings. However, it should be understood that those embodiments are not intended to limit the present invention to specific disclosure forms and they include all changes, equivalents or modifications included in the spirit and scope of the present invention.

Hereinafter, embodiments of the present invention will be described in detail with reference to the accompanying drawings.

FIG. 1 is a block diagram of a visible-light wireless transmitter according to an embodiment of the present invention.

Referring to FIG. 1, a visible-light wireless transmitter may include a brightness control unit 100, a Variable Pulse Position Modulation (VPPM) modulation unit 110, a VPPM-orthogonal frequency division multiplexing (OFDM) modulation unit 120, and an optical signal transmission unit 130.

The brightness control unit 100 transmits a brightness control signal 140 to the VPPM modulation unit 110. The brightness control signal 140 determines a width of a pulse of a VPPM signal, and a brightness control signal 'x' means that a brightness of x is emitted when an on state of an illumination is 1.

The VPPM modulation unit 110 receives a first signal and the brightness control signal 140 and outputs an off signal in a period of $0<t<(1-x)T$ and an on signal in a period of $(1-x)T<t<T$ when data of the first signal is 1 according to the brightness control signal 'x' 140. The VPPM modulation unit 110 outputs the on signal in a period of $0<t<xT$ and the off signal in a period of $xT<t<T$ when the data of the first signal is 0.

The VPPM-OFDM modulation unit 120 receives a VPPM signal 150 and a second signal output from the VPPM modulation unit 110. The VPPM-OFDM modulation unit 120 modulates and outputs the second signal using OFDM in a period where the VPPM signal 150 is at an on level. The VPPM-OFDM modulation unit 120 outputs an off signal in a period where the VPPM signal 150 is at an off level.

Thus, a data rate of a VPPM-OFDM signal 160 is determined depending on a duty cycle of the VPPM signal. For the VPPM signal, 0 and 1 are determined based on pulse transition in a cycle of one period, such that an on state exists at all times.

The duty cycle of the VPPM signal is directly affected by brightness control, as mentioned above. That is, the brighter the illumination, the higher the data rate, and on the other hand, the darker the illumination, the lower the data rate.

In this case, the OFDM modulation is performed in the order described below.

A second signal stream is divided into multiple parallel sub-streams.

Each sub-stream passes through constellation mapping, such as quadrature amplitude modulation (QAM), phase shift keying (PSK), or the like.

The sub-stream is divided into a real-number part and an imaginary-number part through inverse fast Fourier transform (IFFT).

Each of the real-number part and the imaginary-number part is converted into an analog signal through a digital-to-analog converter (DAC).

The real-number part is multiplied by a first carrier, and the imaginary-number part is multiplied by a second carrier having a phase difference of about 90° with respect to the first carrier.

The optical signal transmission unit 130 receives the VPPM-OFDM signal 160 and emits light based on the received VPPM-OFDM signal 160. A light-emitting diode (LED) may be used as a light-emitting element, or any another element may be used, as long as it is a light emitter capable of blinking at a high speed.

The VPPM-OFDM modulation unit 120 may include a digital-to-analog converter (DAC) for converting a digital signal into an analog signal. The DAC needs to have linearity in order to be used in OFDM communication.

As a special case, when the brightness control signal 180 has a value of 1, that is, when the light-emitting element is in an on state at all times, the VPPM signal may not be used because of the absence of pulse transitions, such that the first signal may not be transmitted. In this case, however, the data rate of the VPPM-OFDM signal may be maximized, such that the second signal may be transmitted at a high speed.

Figure 2:
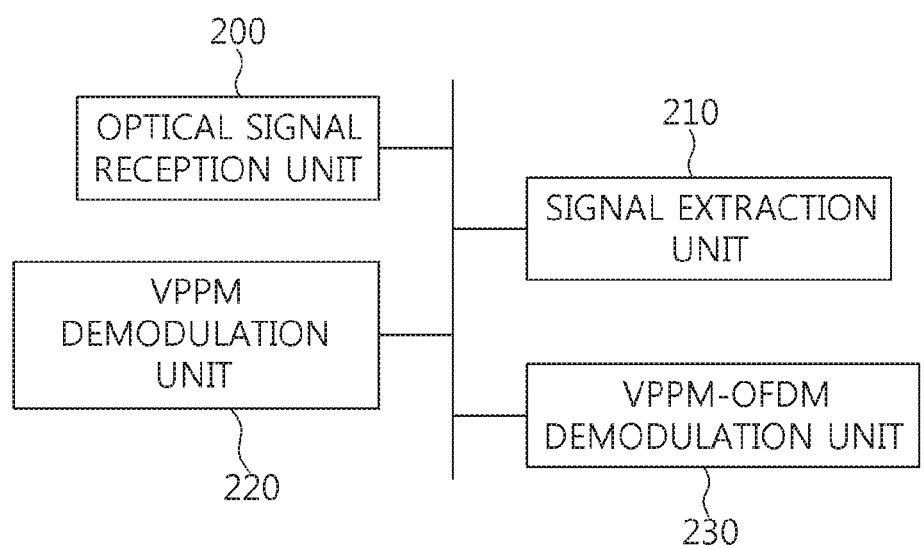
FIG. 2 is a block diagram of a visible-light wireless receiver according to an embodiment of the present invention.

FIG. 2 is a block diagram of a visible-light wireless receiver according to an embodiment of the present invention.

Referring to FIG. 2, the visible-light wireless receiver may include an optical signal reception unit 200, a signal extraction unit 210, a VPPM demodulation unit 220, and a VPPM-OFDM demodulation unit 230.

The optical signal reception unit 200 receives a VPPM-OFDM signal transmitted from the optical signal transmission unit 130 and outputs the received VPPM-OFDM signal.

A light-receiving unit of the optical signal reception unit 200 may include a photodiode and cadmium-sulfide (CDS) or a photo transistor that functions in a manner similar to the photodiode.

The optical signal reception unit 200 may include elements that a general communication receiver may include, such as a noise cancellation unit, a signal amplification unit, and so forth.

The signal extraction unit 210 separates a VPPM signal 250 from a VPPM-OFDM signal 240 received through the optical signal reception unit 200 and outputs the VPPM signal 250. The VPPM signal 250 has a lower frequency than an OFDM signal, and thus, the signal extraction unit 210 for separating the VPPM signal 250 may be configured with a low-pass filter (LPF) or similar.

The VPPM demodulation unit 220 receives and demodulates the VPPM signal 250 separated by the signal extraction unit 210 to output the first signal.

In this case, VPPM demodulation is performed by outputting a data value of 0 in the case of a pulse transition from 1 (High) to 0 (Low) in a cycle of one period and a data value of 1 in the case of a pulse transition from 0 (Low) to 1 (High) in a cycle of one period.

The VPPM-OFDM demodulation unit 230 receives the received VPPM-OFDM signal 240 and the VPPM signal 250 output from the signal extraction unit 210. The VPPM-OFDM demodulation unit 230 waits when the VPPM signal 250 is at the off level, and performs demodulation based on an OFDM scheme to output the second signal when the VPPM signal 250 is at the on level.

The demodulation based on the OFDM scheme is performed as described below.

The first carrier is multiplied to the VPPM-OFDM signal to recover the real-number part, and the second carrier, having a phase difference of about 90° with respect to the first carrier, is multiplied by the VPPM-OFDM signal to recover the imaginary-number part.

Each of the real-number part and the imaginary-number part is filtered and then converted into a digital signal through an ADC.

Multiple sub streams are separated from the converted real-number part and imaginary-number part through FFT.

Each sub stream is converted into a mapped sub stream through a symbol detector.

The mapped sub streams are combined to receive the second signal.

The VPPM-OFDM demodulation unit 230 may include an ADC for converting an analog signal into a digital signal. The ADC needs to have linearity because it is used in OFDM communication.

Figure 3:
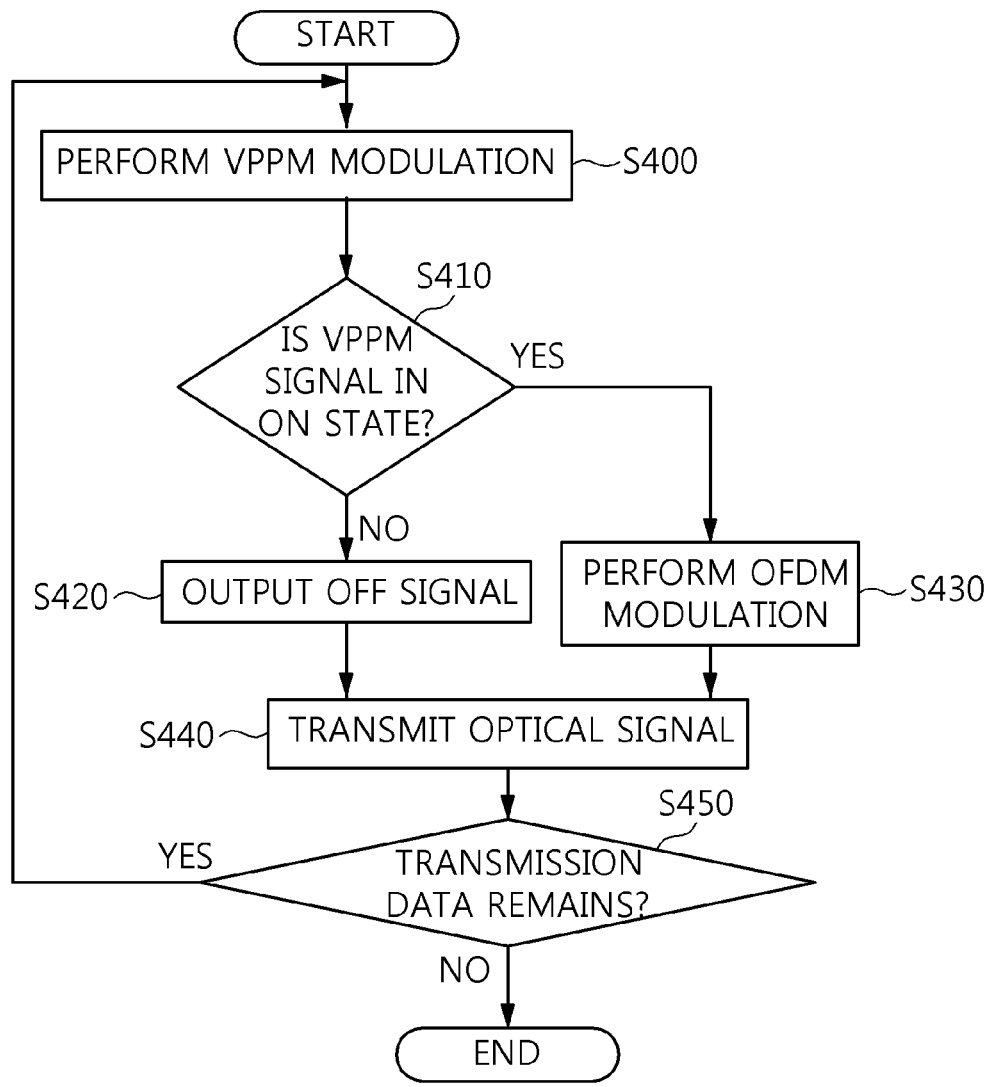
FIG. 3 is an operating flowchart illustrating a visible-light wireless transmission method according to an embodiment of the present invention.

FIG. 3 is an operating flowchart illustrating a visible-light wireless transmission method according to an embodiment of the present invention.

Referring to FIG. 3, in the visible-light wireless transmission method according to the embodiment of the present invention, a brightness control signal is generated based on a brightness level desired by a user.

The brightness control signal and the first signal are received and modulated into a first modulation signal at step S400.

The first signal may be modulated into the first modulation signal using a VPPM scheme that controls the width of a pulse depending on the brightness control signal.

That is, suppose that the brightness control signal is x. Then, if data of the first signal is 1, an off signal is output in a period of $0<t<(1-x)T$ and an on signal is output in a period of $(1-x)T<t<T$. If the data of the first signal is 0, the on signal is output in the period of $0<t<xT$, and the off signal is output in the period of $xT<t<T$. In this way, the first signal is modulated into the VPPM signal.

At step S410, it is determined whether the first modulation signal is at a particular level.

If it is determined at step S410 that the first modulation signal is at the on level, the second signal is modulated using an OFDM scheme to output a second modulation signal at step S430.

In this case, the OFDM modulation is performed in the order described below.

A second signal stream is divided into multiple parallel sub-streams.

Each sub-stream passes through constellation mapping, such as QAM, PSK, or the like.

The sub-stream is divided into a real-number part and an imaginary-number part through IFFT.

Each of the real-number part and the imaginary-number part is converted into an analog signal through a DAC.

The real-number part is multiplied to a first carrier, and the imaginary-number part is multiplied to a second carrier having a phase difference of about 90° with respect to the first carrier.

If it is determined at step S410 that the first modulation signal is at the off level, the second modulation signal is output as the off signal at step S420.

The second modulation signal is also transmitted as a visible-light signal at step S440.

Figure 4:
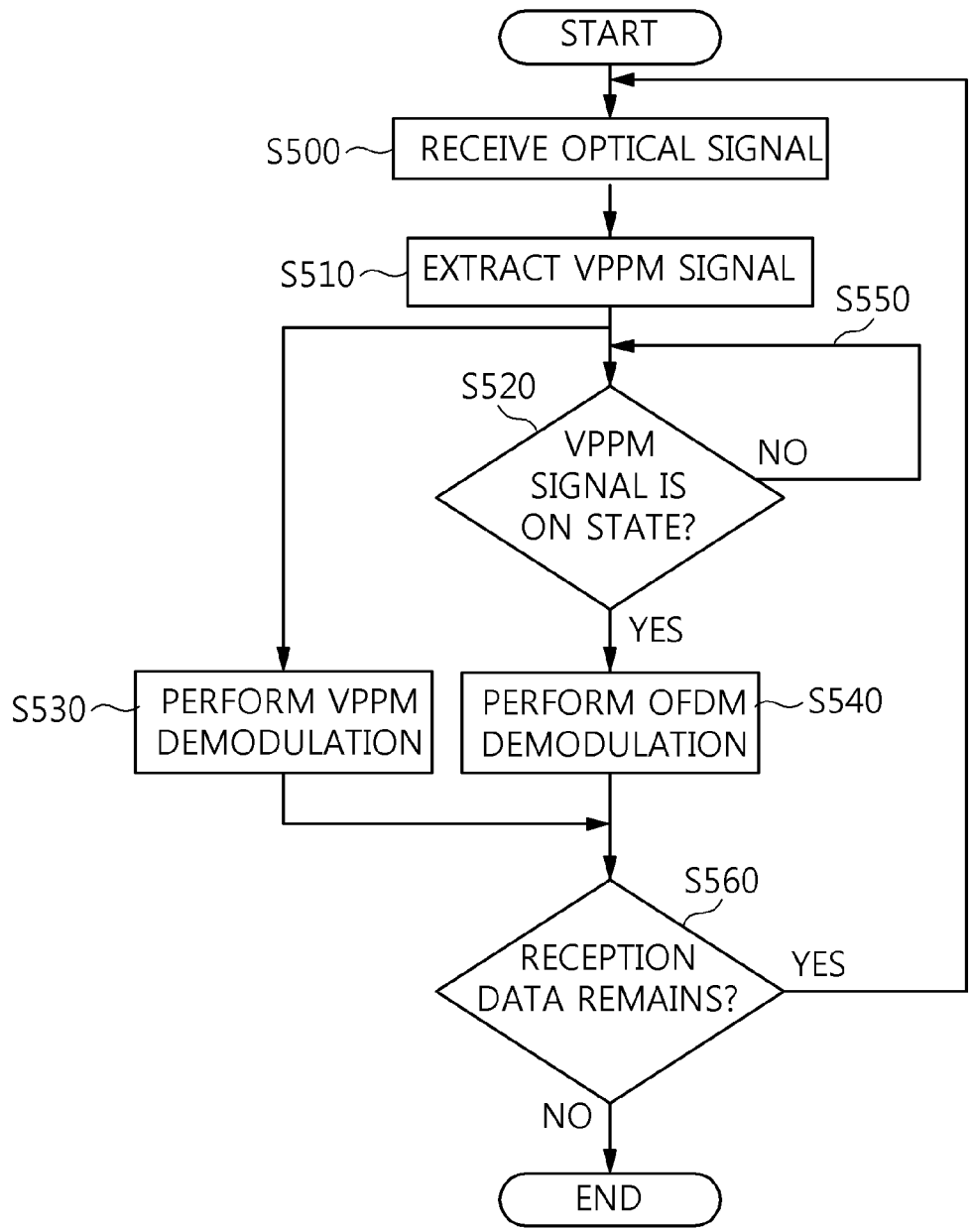
FIG. 4 is an operating flowchart illustrating a visible-light wireless reception method according to an embodiment of the present invention.

FIG. 4 is an operating flowchart illustrating a visible-light wireless reception method according to an embodiment of the present invention.

Referring to FIG. 4, in the visible-light wireless reception method according to the embodiment of the present invention, a visible-light wireless communication signal is received as a raw reception signal at step S500.

A first reception signal is extracted from the raw reception signal at step S510.

In this case, a VPPM signal may be extracted as the first reception signal from the raw reception signal.

The first reception signal may be demodulated into the first signal using the VPPM scheme at step S530.

In this case, the VPPM demodulation includes determining how pulse transition is performed in a cycle of one period at step S570.

If it is determined at step S570 that a pulse transits from 1 (High) to 0 (Low), an off signal is output as the value of the first signal.

If it is determined at step S570 that a pulse transits from 0 (Low) to 1 (High), an on signal is output as the value of the first signal.

It is also determined at step S520 whether the extracted first reception signal is at a particular level.

If it is determined at step S520 that the first reception signal is at the on level, the raw reception signal is demodulated using OFDM to receive the second signal at step S540.

The demodulation based on the OFDM scheme is performed as described below.

The first carrier is multiplied to the VPPM-OFDM signal to recover the real-number part, and the second carrier, having a phase difference of about 90° with respect to the first carrier, is multiplied to the VPPM-OFDM signal to recover the imaginary-number part.

Each of the real-number part and the imaginary-number part is filtered and then converted into a digital signal through an ADC.

Multiple sub streams are separated from the converted real-number part and imaginary-number part through FFT.

Each sub stream is converted into a mapped sub stream through a symbol detector.

The mapped sub streams are combined to receive the second signal.

If it is determined at step S520 that the first reception signal is at the off level, the first reception signal at the on level is waited for at step S550.

Figure 5:
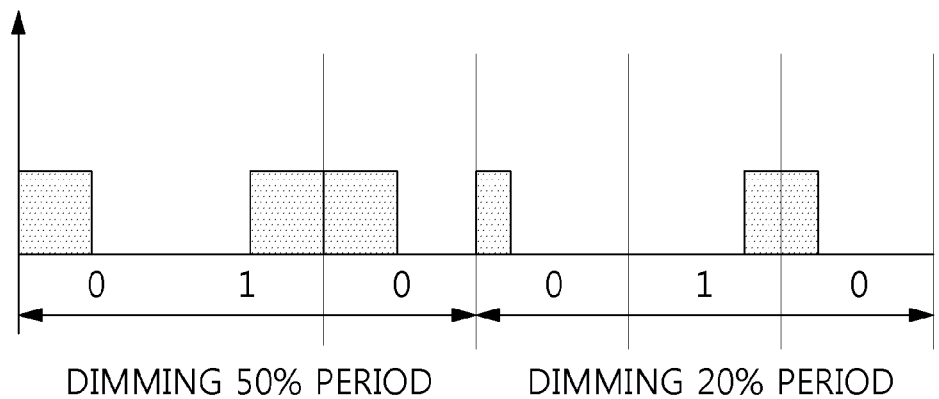
FIG. 5 illustrates a waveform of a VPPM signal.

FIG. 5 illustrates a waveform of a VPPM signal.

VPPM modulation is a transmission scheme adopted as an IEEE 802.15.7 standard, and is capable of dimming illumination and transmitting data. A VPPM signal has a data value of 0 when a pulse transits from 1 (High) to 0 (Low) in a cycle of one period and has a data value of 1 when the pulse transits from 0 (Low) to 1 (High).

Figure 6:
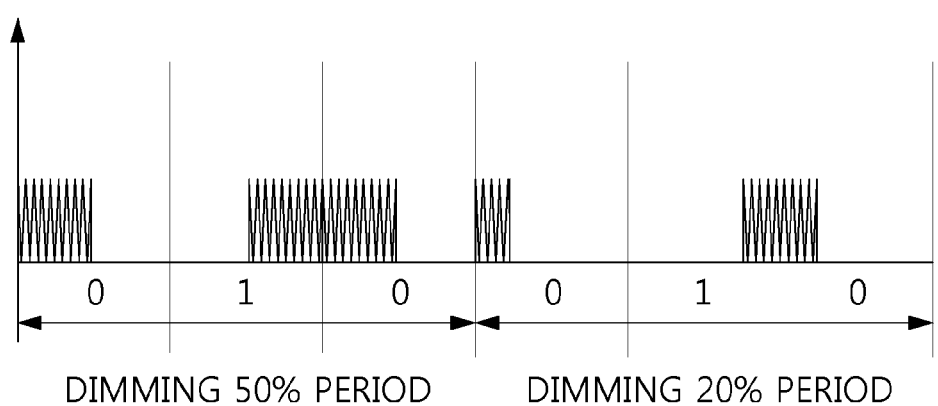
FIG. 6 illustrates a waveform of a VPPM-OFDM signal.

FIG. 6 illustrates the waveform of a VPPM-OFDM signal.

Referring to FIG. 6, a VPPM-OFDM signal corresponding to a transmission waveform of a visible-light wireless communication transmitter according to an embodiment of the present invention has a form in which an OFDM signal is transmitted when the VPPM signal is at the on level. Thus, when compared to the VPPM signal, high-speed data transmission is possible, and at the same time, like the VPPM signal, the brightness of the illumination is controllable.

Figure 7:
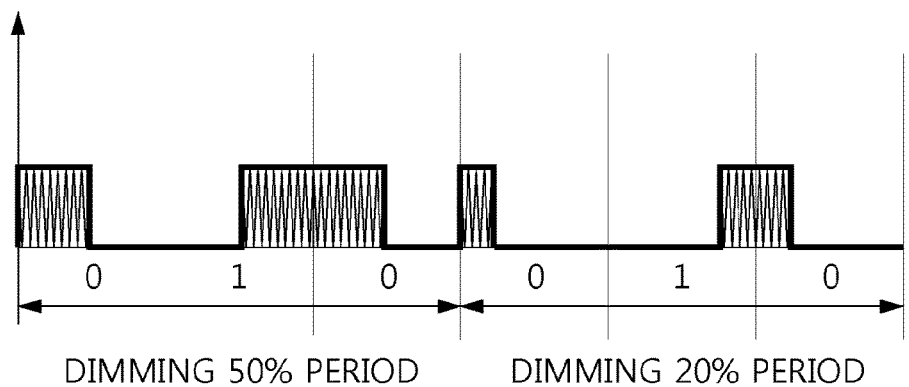
FIG. 7 illustrates a waveform of a VPPM-OFDM signal in which only a VPPM signal is received.

FIG. 7 illustrates a waveform of a VPPM-OFDM signal in which only a VPPM signal is received.

Referring to FIG. 7, if a receiver for receiving a VPPM-OFDM signal has a responding speed such that transition of the VPPM signal may be sensed, but high-frequency fluctuation of the OFDM signal may not be sensed, then the receiver merely performs envelope detection, resulting in receiving the VPPM signal. A camera module of a general smartphone, a web camera, a digital camera, or the like may be the receiver.

Figure 8:
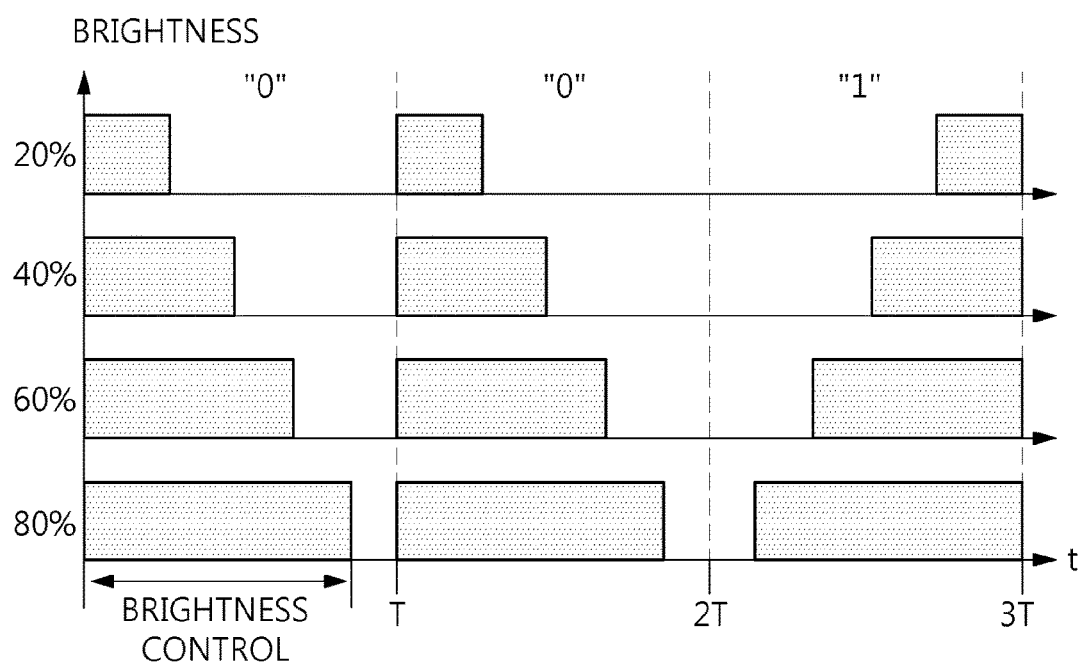
FIG. 8 is a view for describing a method of controlling the brightness of a VPPM signal.

FIG. 8 is a view describing a method of controlling the brightness of a VPPM signal.

The VPPM signal is determined depending on a form of transition in a cycle, such that the length of a pulse does not affect data. Thus, by adjusting the length of the pulse in a cycle T, brightness may be controlled without affecting the data. To maintain the brightness x when the continuous on state of the illumination is 1, the length of the pulse may be adjusted as described below.

That is, if data is 1, the illumination is turned off in a period of $0<t<(1-x)T$ and is turned on in a period of $(1-x)T<t<T$. If data is 0, the illumination is turned on in a period of $0<t<xT$ and is turned off in a period of $xT<t<T$.

According to the present invention, dimming of illumination provided in existing VPPM visible-light wireless communication may be adjusted, and, based on OFDM, high-speed data transmission is possible compared to existing visible-light wireless communication.

According to the present invention, a transmitted signal may be received through an existing device equipped with an image sensor, e.g., a smartphone having a camera mounted thereon, for data communication, without the need for a separate dedicated visible-light communication receiver.

Moreover, according to the present invention, with a dedicated visible-light wireless communication receiver, high-speed data transmission and reception are possible.

As described above, in the visible-light wireless communication apparatus according to the present invention, the configurations and schemes in the above-described embodiments are not limitedly applied, and some or all of the above embodiments can be selectively combined and configured, so that various modifications are possible.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A visible-light wireless communication apparatus comprising:
   a transmitter including:
   a brightness control unit configured to output a brightness control signal for adjusting a brightness of an illumination;
   a first modulation unit configured to receive a first signal and the brightness control signal, to modulate the first signal according to a first modulation scheme and the brightness control signal, and to output a first modulation signal corresponding to the modulated first signal;
   a second modulation unit configured to receive a second signal and the first modulation signal and to modulate the second signal according to a second modulation scheme if the first modulation signal is at a particular level, and to output a second modulation signal corresponding to the modulated second signal; and
   an optical signal transmission unit configured to receive the second modulation signal and to output the received second modulation signal as a visible-light wireless communication signal.

2. The visible-light wireless communication apparatus of claim 1, wherein the first modulation scheme is Variable Pulse Position Modulation (VPPM) for controlling a width of a pulse depending on the brightness control signal.

3. The visible-light wireless communication apparatus of claim 1, wherein the second modulation scheme is orthogonal frequency division multiplexing (OFDM) and the second modulation unit is configured to output the second modulation signal if the particular level is an on level.

4. The visible-light wireless communication apparatus of claim 1, wherein the optical signal transmission unit comprises a light-emitting unit comprising a light-emitting diode (LED).

5. The visible-light wireless communication apparatus of claim 1, wherein the second modulation unit comprises a linear digital-to-analog converter (DAC).

6. A visible-light wireless communication apparatus comprising:
   a receiver including:
   an optical signal reception unit configured to receive a visible-light wireless communication signal as a raw reception signal;
   a signal extraction unit configured to extract a first reception signal from the raw reception signal and to output the extracted first reception signal;
   a first demodulation unit configured to demodulate the extracted first reception signal according to a first demodulation scheme and to output the demodulated first reception signal as a first signal; and
   a second demodulation unit configured to demodulate the raw reception signal according to a second demodulation scheme and to output the demodulated raw reception signal as a second signal, if the extracted first reception signal is at a particular level.

7. The visible-light wireless communication apparatus of claim 6, wherein the extracted first reception signal is a Variable Pulse Position Modulation (VPPM) signal.

8. The visible-light wireless communication apparatus of claim 6, wherein the first demodulation scheme is a Variable Pulse Position Modulation (VPPM) scheme.

9. The visible-light wireless communication apparatus of claim 8, wherein the signal extraction unit comprises a low-pass filter (LPF).

10. The visible-light wireless communication apparatus of claim 6, wherein the second demodulation scheme is an orthogonal frequency division multiplexing (OFDM) scheme and the particular level is an on level.

11. The visible-light wireless communication apparatus of claim 6, wherein the optical signal reception unit comprises a light-receiving unit comprising a photodiode.

12. The visible-light wireless communication apparatus of claim 6, wherein the optical signal reception unit comprises a noise cancellation unit for cancelling a noise signal from the received visible-light wireless communication signal.

13. The visible-light wireless communication apparatus of claim 6, wherein the second demodulation unit comprises a linear analog-to-digital converter (ADC).

14. A visible-light wireless communication method comprising:
   generating a brightness control signal;
   modulating a first signal according to a first modulation scheme based on the brightness control signal, to output a first modulation signal;
   modulating a second signal according to a second modulation scheme, to output a second modulation signal, if the first modulation signal is at a particular level; and
   transmitting the second modulation signal as a visible-light wireless communication signal.

15. The visible-light wireless communication method of claim 14, wherein modulating the first signal according to the first modulation scheme comprises:
   modulating the first signal using Variable Pulse Position Modulation (VPPM) for controlling a width of a pulse depending on the brightness control signal.

16. The visible-light wireless communication method of claim 14, wherein modulating the second signal according to a second modulation scheme comprises modulating the second signal using orthogonal frequency division multiplexing (OFDM) if the particular level is an on level.

17. A visible-light wireless communication method, comprising:
   receiving a visible-light wireless communication signal as a raw reception signal;
   extracting a first reception signal from the raw reception signal;
   demodulating the extracted first reception signal according to a first demodulation scheme and outputting the demodulated first reception signal as a first signal; and demodulating the raw reception signal according to a second demodulation scheme and outputting the demodulated raw reception signal as a second signal, if the first reception signal is at a particular level.

18. The visible-light wireless communication method of claim 17, wherein extracting the first reception signal comprises extracting a Variable Pulse Position Modulation (VPPM) signal from the raw reception signal.

19. The visible-light wireless communication method of claim 17, wherein demodulating the first reception signal according to the first demodulation scheme includes using Variable Pulse Position Modulation (VPPM).

20. The visible-light wireless communication method of claim 17, wherein demodulating the raw reception signal according to a second demodulation scheme includes using orthogonal frequency division multiplexing (OFDM) if the particular level is an on level.

* * * * *